United States Patent [19]

Albrecht

[11] Patent Number: 4,821,368
[45] Date of Patent: Apr. 18, 1989

[54] ECCENTRIC SHOCK ISOLATION GROMMET

[75] Inventor: Larry Albrecht, Colorado Springs, Colo.

[73] Assignee: Digital Equipment Corporation, Maynard, Mass.

[21] Appl. No.: 93,189

[22] Filed: Sep. 4, 1987

[51] Int. Cl.$^4$ ............................................. B65D 55/00
[52] U.S. Cl. ......................................... 16/2; 248/56; 174/152 G; 174/153 G
[58] Field of Search ............................. 16/2; 248/56; 174/152 G, 153 G, 65 G

[56] References Cited

U.S. PATENT DOCUMENTS 3,654,382  4/1972  Rubright ........................ 174/153 G
4,041,241  8/1977  Olmstead et al. ..................... 248/56

FOREIGN PATENT DOCUMENTS 2353619   5/1975  Fed. Rep. of Germany ........ 248/56
2032054A  4/1980  United Kingdom ..................... 16/2

Primary Examiner—Richard K. Seidel
Attorney, Agent, or Firm—Kenyon & Kenyon

[57] ABSTRACT

An eccentric shock isolation grommet assembly is provided in which the centerline of the attachment ferrule is off-set from the centerline of the entire grommet assembly such that the weight of the component to be supported in vibratory isolation deforms the grommet into a generally symmetrical shape and positions the component in the center of the grommet's deformable sway space.

12 Claims, 5 Drawing Sheets

ECCENTRIC SHOCK ISOLATION GROMMET

BACKGROUND OF THE INVENTION

This invention relates to disk drives in general and more particularly to an isolation grommet which supports a component of the disk drive in vibratory isolation from the supporting structure of the grommet.

The basic configuration of the isolation grommet of the prior art is shown FIG. 1 at 10. Such a grommet is generally made of an elastomeric material such as rubber so that any vibration of the supporting structure damps within the grommet itself rather than being transmitted to the component to be supported in isolation. Grommet 10 comprises a relatively thick and stiff outer portion 14 which is separated from inner portion 11 containing a concentric bore 12 by a relatively thin intermediate portion 13. Grommet 10 may be attached to the supporting structure (a portion of which is illustrated at 16) by fasteners 15. The component 18 to be supported in isolation may be part of a disk drive and has an attachment ferrule 17 connected thereto. Ferrule 17 snugly fits within bore 12 of inner grommet portion 11. The centerline of ferrule 17 coincides with the respective centerlines of bore 12 and grommet 10 to define a symmetrical grommet as will be subsequently discussed. Vibration of supporting structure 16 of grommet 10 is absorbed or damped within inner portion 13 of the grommet rather than being transmitted to component 18. Component 18 may be the sealed housing which contains the disks and positioner of a disk drive. It may be supported within an outer supporting structure or housing by four grommets.

The problems incurred when using symmetrical grommets can be best demonstrated by reference to FIGS. 2-4. Since the isolation grommet's function may be analogized as a spring, its operation may be represented by a stiffness or force vs. deflection curve such as that illustrated in FIG. 2. The stiffness of an elastomeric isolation grommet is a function of the grommet shape, the modulus of elasticity of the grommet material and the amount of deformation. For most grommet shapes and elastomer materials the force vs. deflection curve will be nonlinear over some or the entire portion of the curve. Thus, the grommet may have a break point in the curve where its Hookes constant changes from one value to another. Such a point is illustrated in FIG. 2 at d. The amount of deformation or deflection that will be produced by a given force acting on a linear isolation grommet of a specified shape and modulus of elasticity may be represented by the following equation:

$$f = kx,$$

where f is the force applied to the grommet, k is the value of Hookes constant and x is the amount of deflection. Since the value of Hookes constant or k changes at point d of the curve as shown in FIG. 2, the amount of deformation produced by a given force varies according to the portion of the curve in which the grommet is operating.

It is often desirable to control or limit the region of the force-deflection curve in which the isolation grommet is to operate during specified shock and vibration loads to the linear portion of the curve in order to accurately predict and design for the response of the grommet to shock and vibration input changes. The symmetrical isolation grommets often operate in the undesirable nonlinear portion of the stiffness curve as can be seen with reference to FIGS. 3 and 4. If dynamic forces are applied to a symmetrical isolation grommet already under a static load, the grommet often deflected such that it would not properly isolate against the dynamic forces.

FIG. 3 is a simplified sectional view of symmetrical isolation grommet in an unloaded condition. The attachment ferrule is schematically indicated at 17 and is snugly secured within bore 12 of mid-section 11 of the grommet. Bore 12 is symmetrically located on the centerline g—g of the grommet such that the centerline of the ferrule f—f coincides with the centerline of the grommet g—g. FIG. 4 shows the condition of the grommet when a load designated as L is imposed upon the grommet. Such load may be the static weight of the component to be isolated by the grommet. Under load, the flexible intermediate region 13 of the grommet deforms allowing the thick central portion 11 and the lower edge 14 of the grommet to contact or snub. Since any further deformation of the grommet would now include the thick region 14, this effectively changes the stiffness or Hookes constant of the grommet such that the grommet no longer operates in the linear portion of the curve. When the operating portion of the curve is changed, the response of the grommet to shock and vibration inputs also changes. As previously mentioned, the problem with the prior symmetrical grommets was that in use the weight of the object supported deformed the grommet causing the undesirable snubbing situation just described. More particularly, the problems caused by the preload deformation due to the weight of the object to be supported were:

(1) a reduction of the sway or damping space since the object supported is already at a limit of its traversal; and (2) a different response to shock and vibration inputs than may have been desired or designed for since additional deformation may cause the object to move into the nonlinear portion of the stiffness curve.

SUMMARY OF THE INVENTION

Applicant has solved these problems by providing an asymmetrical or eccentric shock isolation grommet in which the centerlines of the inner grommet portion and ferrule are off-set from the centerline of the entire grommet. The off-set distance of the two axes may be approximately 0.028 inches such that the deformation caused by the weight of the object to be supported in isolation deforms the grommet into a symmetrical shape with the inner grommet portion and ferrule centerlines now being coincidental with the centerline of the grommet. This allows the deformation caused by the weight of the object supported to position the object at the location in the sway space where it would have the most freedom of motion instead of at the extreme end of the sway space as is the case with the prior symmetrical grommets under weight deformation. Furthermore, the amount of deformation which is required to cause snubbing of an eccentric grommet is greater and the component being isolated can withstand higher shock and vibration inputs before the isolation grommet begins to operate in the nonlinear portion of the stiffness curve than was previously possible with prior symmetrical grommets.

An eccentric grommet assembly is disclosed having an undeformed, asymmetrical rest position and a deformed, generally symmetrical rest position in which the thick outer grommet portion includes a mounting plate having holes for attachment to a supporting structure. The inner grommet portion is eccentrically located within the thin, intermediate damping portion of the grommet. The inner grommet portion has a bore therethrough with a longitudinal axis which defines the centerline of the inner grommet portion. The bore defines mounting means adapted to receive an attachment ferrule. The ferrule has a centerline which coincides with the centerline of the inner grommet portion and is offset from the centerline of the entire grommet assembly when the grommet is not subject to the weight of the component to be supported in vibratory isolation. The component may be a part of a disk drive assembly and when attached to the grommet by the ferrule, the intermediate grommet portion is deformed such that the centerline of the ferrule is coincidental with the centerline of the entire grommet and the grommet occupies it deformed, generally symmetrical rest position.

The thin intermediate grommet portion may comprise a highly damped elastomer and may be integrally formed as a single piece with the thick and hence stiff outer and inner grommet portions.

DETAILED DESCRIPTION

Figure 1:
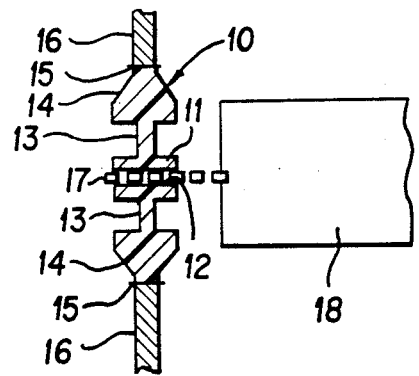
FIG. 1 is a cross sectional view of a symmetrical isolation grommet of the prior art.
Figure 2:
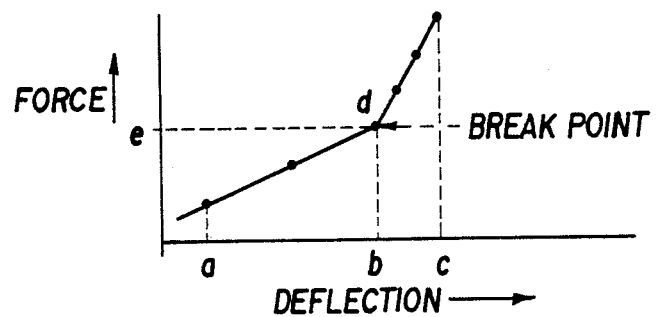
FIG. 2 is a graph of a force vs. deflection curve which may be used to represent the operation of an isolation grommet.
Figure 3:
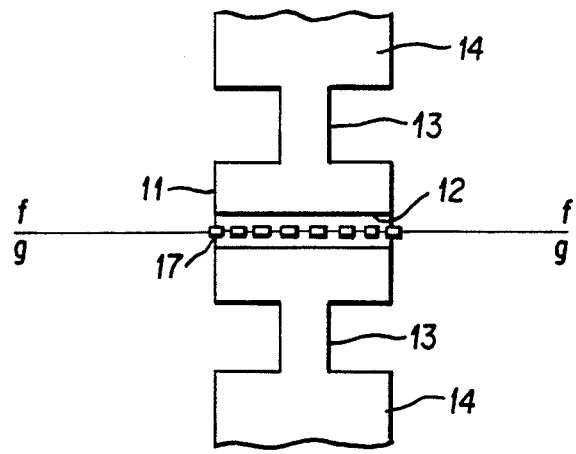
FIG. 3 is a simplified sectional view of a symmetrical isolation grommet in an unloaded condition.
Figure 4:
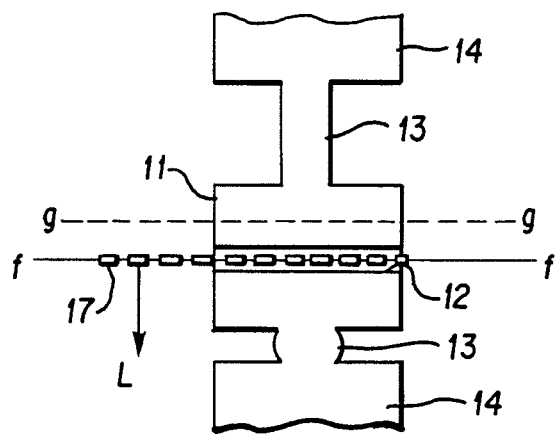
FIG. 4 is a simplified sectional view of a symmetrical isolation grommet in an loaded condition.
Figure 5:
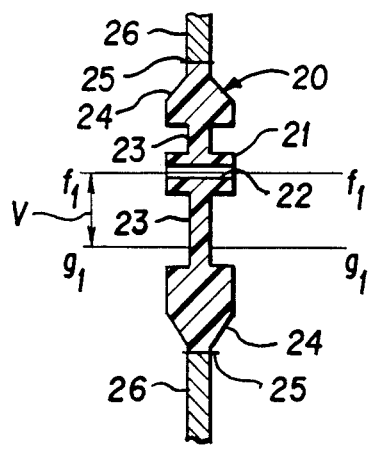
FIG. 5 is a cross sectional view of an eccentric shock isolation grommet in an unloaded condition.
Figure 6:
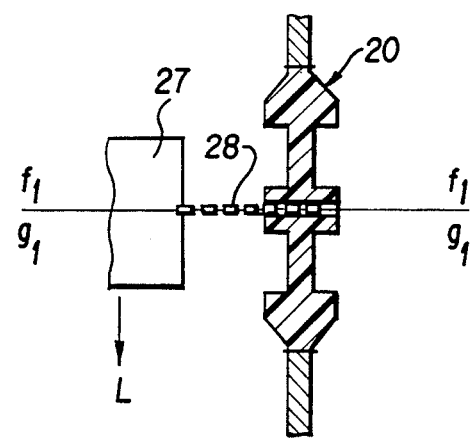
FIG. 6 is a cross sectional view of an eccentric shock isolation grommet in a loaded condition.

The eccentric nature of the improved isolation grommet can best be seen with reference to FIGS. 5-6. FIG. 5 shows the grommet in an unloaded condition while FIG. 6 shows the same eccentric grommet in a loaded condition. Eccentric grommet 20 comprises a thick and hence stiff, annular outer end portion 24 which is separated from an eccentrically mounted thick, inner cylindrical portion 21 containing bore 22 by a thin, deformable, intermediate annular portion 23. The centerlines of bore 22 and ferrule 28 coincide as shown at $f_1$—$f_1$ and are off-set by a distance v from the centerline of the entire grommet assembly shown at $g_1$—$g_1$ FIG. 5 is shown greatly exaggerated as the off-set distance v may be 0.028 inches. The grommet is connected by suitable fastening means 25 to its supporting structure 26. The eccentric shock isolation grommet is designed such that the deformation caused by the weight of the disk drive component to be supported deforms the grommet into a generally symmetrical shape as best seen in FIG. 6. The force imposed by the weight of the object to be supported in isolation 27 is designated by the arrow L and deforms the grommet such that the ferrule centerline $f_2$—$f_2$ coincides with the centerline of the entire grommet $g_1$—$g_1$. In this manner the eccentric grommet allows the deformation caused by the weight of the object supported to position the object at the location in the sway space where it would have the most freedom of motion. The amount of deformation which is required to cause snubbing is greater than that of the prior symmetrical grommets and the component being isolated can withstand higher shock and vibration inputs before the isolation grommet begin to operate in the nonlinear portion of the stiffness curve. An embodiment of the eccentric isolation grommet assembly is illustrated in FIGS. 7-14.

Figure 7:
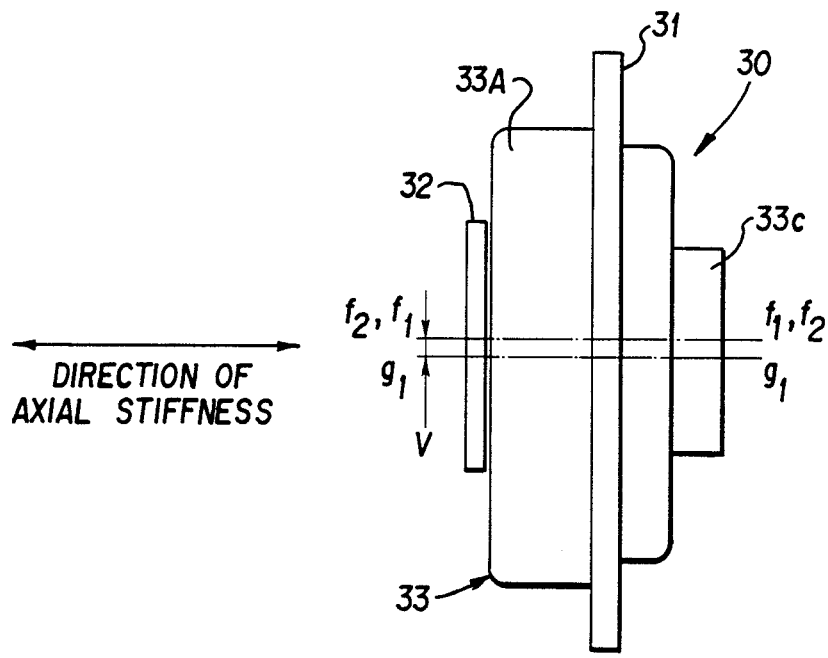
FIG. 7 is a side view of an eccentric isolation grommet assembly constructed according to the principles of the invention.
Figure 9:
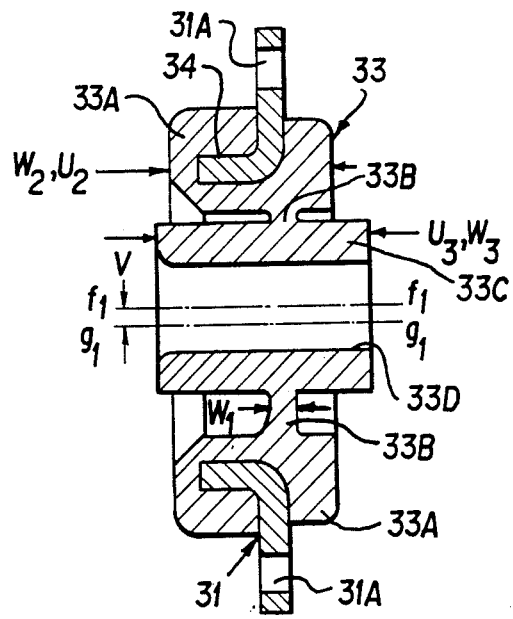
FIG. 9 is a cross sectional view of an elastomeric base member and mounting plate of the eccentric isolation grommet assembly taken along line C—C of FIG. 10.

FIG. 7 is a side view of an eccentric isolation grommet assembly 30 constructed according to the principles of the invention. Assembly 30 basically comprises three parts, namely, elastomeric base member 33, attachment ferrule 32 and mounting plate 31. Base member 33 includes a thick and stiff outer annular portion 33a, thin and deformable intermediate annular portion 33b (best seen in FIG. 9) and inner sleeve-like or cylindrical portion 33c which is also thick and stiff. FIG. 7 also shows attachment ferrule 32 received within grommet assembly 30. The attachment ferrule is snugly received within bore 33d of intermediate portion 33c as shown in FIG. 9. The longitudinal axis or centerline of intermediate portion 33c and bore 33d is shown by line $f_1$—$f_1$ in the Figures. The longitudinal axis or centerline of the entire grommet assembly is axially off-set from line $f_1$—$f_1$ and is shown as line $g_1$—$g_1$. The distance by which the two axes are off-set is indicated as v and may have a value of approximately 0.028 inches when the grommet is supporting a component having a weight of 2.4 pounds.

Figure 10:
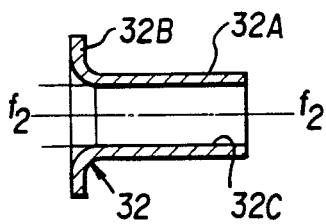
FIG. 10 is a cross sectional view of and an attachment ferrule taken along line E—E of FIG. 11.
Figure 11:
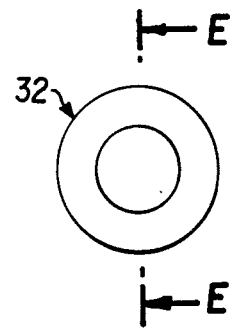
FIG. 11 is an end view of an attachment ferrule.

The attachment ferrule is shown in FIGS. 10 and 11 and comprises a sleeve-like portion 32a and a radially outwardly extending annular portion 32b. Attachment ferrule 32 has a bore therethrough indicated at 32c having a longitudinal axis or centerline $f_2$—$f_2$. As shown in FIG. 7, the attachment ferrule 32 is received within bore 33d of intermediate portion 33c such that the longitudinal axis of bore 33d ($f_1$—$f_1$) coincides with the longitudinal axis or centerline of the attachment ferrule ($f_2$—$f_2$). Both of these coincidental centerlines are off-set from the centerline of the grommet $g_1$—$g_1$ by the distance v when the grommet is in its undeformed, asymmetrical rest position, i.e., when it is not subjected to a load defined by the weight of the component to be supported in vibratory isolation. The component is attached to the grommet assembly by insertion of a portion of the component (or a member attached thereto) into the bore 32c of attachment ferrule 32. Upon attachment of the component to the grommet assembly in the aforementioned manner, the weight of the component will deform intermediate portion 33b of the grommet assembly such that the coincidental centerlines $f_1$—$f_1$ and $f_2$—$f_2$ are downwardly deflected so as to coincide with the centerline $g_1$—$g_1$ of the grommet assembly. This deforms the grommet into a generally symmetrical shape in which the component is supported in the middle of the sway space as previously discussed in connection with the description of FIGS. 5 and 6.

The cross sectional view of the elastomeric base member 33 shown in FIG. 9 illustrates all three portions of base member 33. Intermediate annular portion 33b is connected at its radially inward end to inner portion 33c and at its radially outward end to outer portion 33a. As shown in FIG. 9, the cross sectional width $w_1$ of intermediate portion 33b is greatly reduced in comparison to the respective widths $w_2$, $w_3$ of portions 33a and 33c such that the deformation or damping movements of the grommet assembly is generally confined to intermediate portion 33b. Deformation of the grommet assembly to its at rest, generally symmetrical, working position in which coincidental centerlines $f_1$—$f_1$ and $f_2$—$f_2$ are downwardly displaced so as to coincide with centerline $g_1$—$g_1$ of the grommet assembly places intermediate portion 33c in the center of the grommet assembly such that the component to be supported is now symmetrically positioned at the location in the sway space where it has the most freedom of motion.

Intermediate portion 33b is a highly damped elastomer which may have the following characteristics:
 (a) Specific Gravity 1.17 +or −0.02;
 (b) Tensile Strength: 2220 psi;
 (c) Durometer: 71 per ASTM D2240;
 (d) Elongation: 390%;
 (e) Tear Resistance: 220 pounds per inch
 (f) Compression Set (22 hours at 158° F.): 28% maximum.

Figure 8:
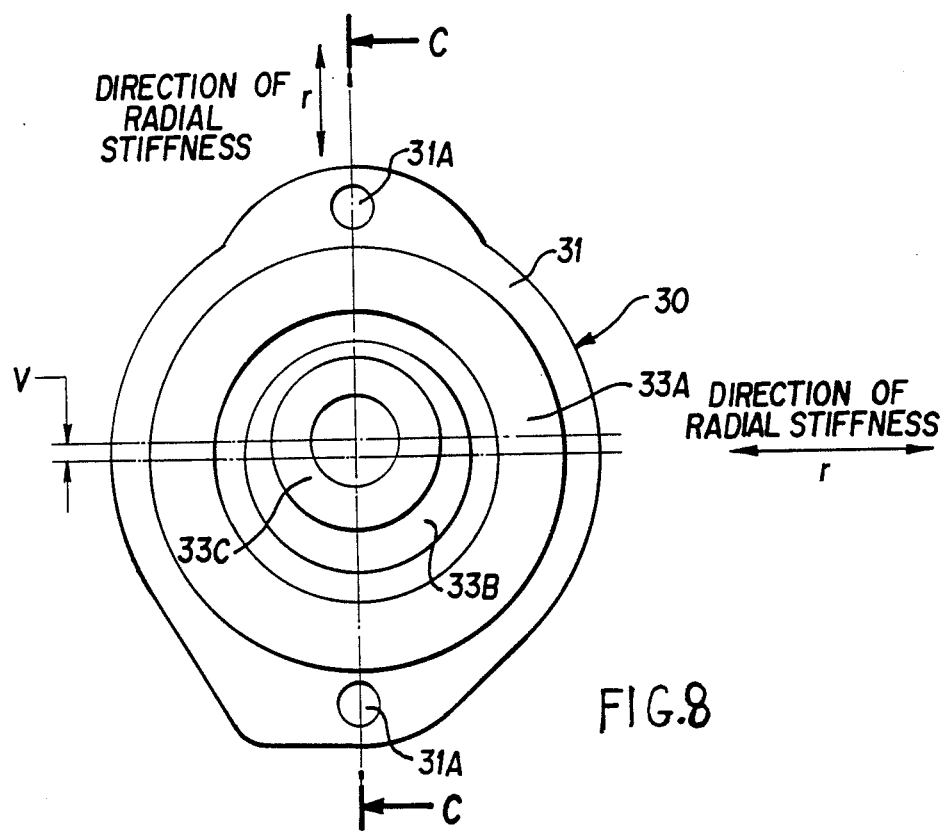
FIG. 8 is an elevational end view of the eccentric isolation grommet assembly shown in FIG. 7.
Figure 12:
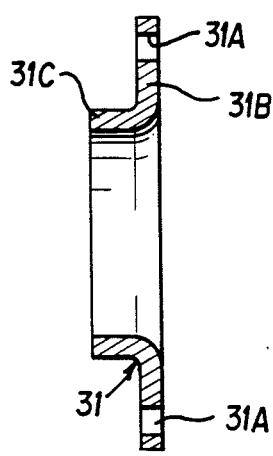
FIG. 12 is a cross sectional view of the mounting plate shown in FIG. 9.
Figure 13:
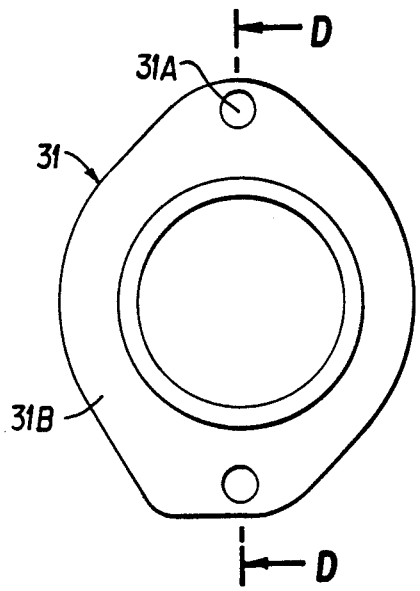
FIG. 13 is an end view of the mounting plate shown in FIG. 12.

Portions 33a, 33b and 33c of elastomer base may be integrally molded as a single piece. Outer portion 33a of elastomeric base 33 contains a recess 34 in which mounting plate 31 is received. The plate 31 may be bonded within the recess to base 33. As shown in FIGS. 12-13, mounting plate 31 comprises a sleeve-like portion 31c and a outwardly radially extending portion 31b connected thereto. Portion 31b has a plurality of holes 31a which may cooperate with fasteners for attaching the grommet assembly to a supporting structure. The mounting plate and attachment ferrule may be formed from The grommet assembly has the following characteristics:
 (1) radial static deflection of the grommet is a maximum of 0.03 inches when a 2.4 pound force is downwardly applied;
 (2) The dynamic stiffness in a radial direction (as shown in FIG. 8) is 550 pounds force per inch when subjected to a 2.4 pound weight acting radially and excited with a 0.005 double amplitude sine input of 45 Hz;
 (3) The radial/axial stiffness of the grommet is 350 pounds force per inch when subjected to a 2.4 pound weight acting radially and excited with a 0.008 double amplitude sine input acting at 45° to both the axial and radially axis at 35 Hz. (The dynamic values are measured by supporting a 9.6 lb. mass using four grommets mounted in the supporting structure and subjecting the supporting structure to a vertical excitation for measurement of radial stiffness and a horizontal excitation for measurement of radial/axial stiffness.)

The electrical resistivity of the elastomer is selected to be $6 \times 10^8$ to $3 \times 10^{10}$ ohms-centimeters such that the electrical resistance of the isolation assembly is greater than $10^9$ ohms as measured from the ferrule to the mounting plate.

The mounting plate and attachment ferrule may be formed from steel.

What I claim is:
1. An eccentric isolation grommet assembly comprising:
 (a) a stiff inner portion having a first axis defining the centerline of said inner portion;
 (b) a stiff outer portion having a second axis defining the centerline of said outer portion, said outer portion surrounding the inner portion;(and)
 (c) an intermediate portion, having a substantially smaller cross sectional width than the cross sectional width of said outer portion, resiliently supporting said inner portion within the outer portion with said first axis being off-set from said second axis; and
 (d) a structure having a sway space coupled to said outer portion for supporting said inner, outer and intermediate portions and a component, said component being supported in three dimensional vibratory isolation coupled to said inner portion, said component further having a weight imposing a load upon said grommet assembly that second axes coincide to center said components in the sway space allowing maximum freedom of motion under dynamic loads.

2. An eccentric isolation grommet assembly as defined in claim 1 wherein said inner portion is cylindrical and comprises a bore receiving an attachment ferrule having a third axis defined along its longitudinal centerline with said third axis coinciding with the first and second axes in the loaded condition.

3. An eccentric isolation grommet assembly as defined in claim 2 wherein said intermediate portion comprises a highly damped elastomer.

4. An eccentric isolation grommet assembly as defined in claim 3 wherein the longitudinal extent of said bore is at least as great as the cross sectional width of said outer portion, said outer portion comprises an annular elastomeric base member including a mounting plate fixedly secured to said base member, said mounting plate comprises a sleeve portion and a radially outwardly extending annular portion, said annular portion including a plurality of holes defining means for attaching said supporting structure to said grommet.

5. An eccentric isolation grommet assembly as defined in claim 4 wherein said mounting plate is formed from a nonelastomeric material and is bonded within a recess in said elastomeric base member.

6. An eccentric isolation grommet assembly as defined in claim 5 wherein said attachment ferrule comprises a sleeve portion and a radially outward extending annular portion, said sleeve portion defining a bore therethrough adapted to receive a portion of said component to be supported in vibratory isolation.

7. An eccentric isolation grommet assembly as defined in claim 6 wherein said attachment ferrule and said mounting plate are formed from steel.

8. An eccentric isolation grommet assembly as defined in claim 4 wherein said highly damped elastomer has a tensile strength of approximately 2220 psi, an elongation of approximately 390% and a tear resistance of approximately 220 pounds per inch.

9. An eccentric isolation grommet assembly as defined in claim 3 wherein said outer portion, inner portion and intermediate portion are integrally formed as a single piece.

10. An eccentric isolation grommet assembly as defined in claim 1 wherein said first axis is off-set from said second axis by a distance of approximately 0.028 inches.

11. An eccentric isolation grommet assembly as defined in claim 1 wherein said component comprises a part of a disk drive defining a sealed housing.

12. An eccentric isolation grommet comprising means for supporting a static load including:
   (a) a stiff cylindrical inner portion having a first axis defining the centerline of said inner portion;
   (b) a stiff annular outer portion having a second axis defining the centerline of said outer portion, said outer portion surrounding the inner portion;
   (c) an intermediate portion having a substantially smaller cross sectional width than the cross sectional width of said outer portion, said intermediate portion resiliently supporting said inner portion with said first axis being off-set from said second axis, said inner, outer and intermediate portions being located in a sway space whereby said grommet in the static load condition centers the load in the sway space allowing maximum freedom of motion under dynamic loads.

* * * * *